(No Model.)
W. S. CALLAGHAN.
PNEUMATIC TIRE.
No. 514,412. Patented Feb. 6, 1894.
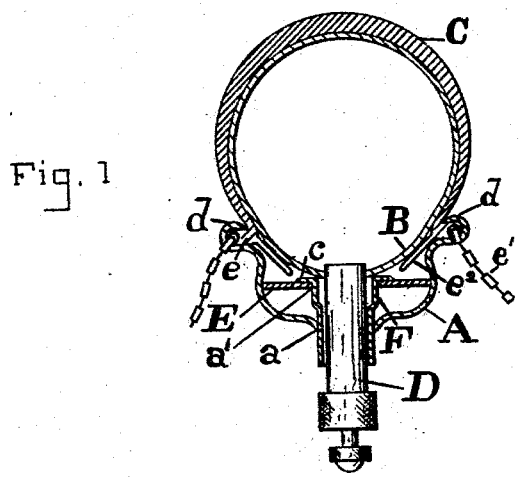
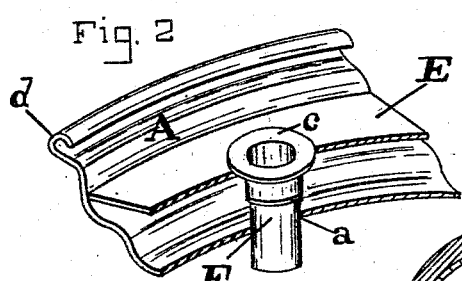
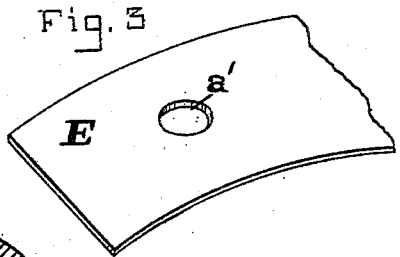
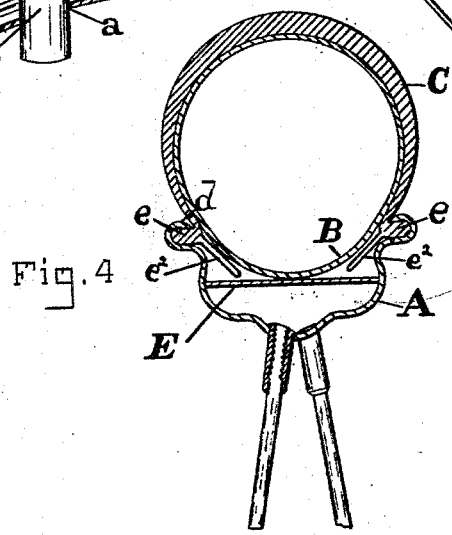
WITNESSES
L. Ismy Van Horn.
Charles B. Mann Jr.
INVENTOR
W. S. Callaghan
By Chas B. Mann
ATTORNEY

UNITED STATES PATENT OFFICE.

WILLIAM S. CALLAGHAN, OF BALTIMORE, MARYLAND, ASSIGNOR OF ONE-HALF TO CHARLES T. HOLLOWAY, OF SAME PLACE.

PNEUMATIC TIRE.

SPECIFICATION forming part of Letters Patent No. 514,412, dated February 6, 1894.

Application filed September 5, 1893. Serial No. 484,810. (No model.)

*To all whom it may concern:*

Be it known that I, WILLIAM S. CALLAGHAN, a citizen of the United States, residing at Baltimore, in the State of Maryland, have invented certain new and useful Improvements in Pneumatic-Tired Wheels, of which the following is a specification.

My invention relates to certain improvements in the rims of pneumatic-tired wheels.

My invention consists in certain novel constructions, combinations and arrangements of parts, as will be hereinafter described and claimed.

In the accompanying drawings, Figure 1 is a cross section of the rim and tire at the valve and showing the chain in the flanged edges of the cover. Fig. 2 is a broken detail view in perspective of a portion of the rim, the shielding-plate and valve-thimble. Fig. 3 is a perspective view of a piece of the shielding plate, and Fig. 4 is a cross section showing the tire-guarding plate in position in the rim between the point where the spokes enter and the tire rests.

The letter A designates the rim of the wheel; B the tube of the tire; C the covering thereof, and D the valve attached to the tube by which it is inflated.

The rim, A, is provided with a hole or perforation, $a$, for the insertion of the valve-tube. Inside of the rim I place a plate or seat, E, extending entirely around. This plate is provided with a hole or perforation, $a'$, at a point coinciding with the similar perforation, $a$, in the rim, for entrance of the valve-tube. It has been found in practice that where the valve-tube enters the ordinary hole in the rim the edge of the metal at the hole wears and cuts the rubber tube and soon causes a leakage of air. To overcome this difficulty, I provide a thimble or bushing, F, with a flange, $c$, at one end; the thimble passes through the hole, $a'$, in the rim, the flange, $c$, resting on the shield plate. Thus the thimble is held firmly and cannot wabble and it covers the edges of the metal at both holes, $a$, $a'$. The pneumatic tire, B, rests between the edges, $d$, of the rim and seats upon the plate, E, while the valve-tube, D, passes through the thimble or bushing, F. By this construction and combination, the bushing holds the valve-tube firmly and prevents any movement thereof and protects the rubber of the tire, B, where the valve-tube, D, is attached, from being chafed and cut. The covering, C, of the tire is formed with flanged edges, $e$, which take into or interlock with the inturned edges, $d$, of the metal rim. Each edge of the cover incloses a chain, $e'$, which extends along the entire length of the cover, that is, entirely around the rim of the wheel; while the chain does not hinder the lateral flexibility of the cover, it does prevent longitudinal stretching. A flexible edge, $e^2$, projects beyond the flange toward the shield-plate, E, and has position between the pneumatic tire, B, and the sides of the metal rim; these edges, $e^2$, serve as a shield to prevent the tire from chafing or rubbing against the hard metal sides of the rim, and also by impinging against the sides of the pneumatic tire they prevent the flanges, $e$, of the tire-cover from becoming accidentally detached from the inturned edges of the rim.

By my invention, the annoyance and inconvenience arising from the wearing away and cutting of the rubber tire about the valve-hole are avoided; and the puncture of the tire from loose spokes cannot possibly happen, as the protecting plate is interposed between the tire and that part of the rim where the ends of the spokes are secured.

Having thus described my invention, what I claim as new, and desire to secure by Letters Patent, is—

1. In a vehicle wheel, the combination of a hollow metal rim having at each side an inturned hooked edge; an annular tire-shielding plate, E, seated in the hollow rim below the said inturned edges; a pneumatic tire between the two sides of the hollow rim and resting on the shield-plate; and a cover for the pneumatic tire having outward flanged edges, $e$, interlocking with the inturned hooked edges of the metal-rim.

2. In a vehicle wheel, the combination of a hollow metal rim having inturned hooked edges; a pneumatic tire between the two sides of the hollow rim; and a cover for the said tire having outward flanges, $e$, which interlock with the said inturned hooked edges on the rim and provided with flexible edges, $e^2$, projecting between the sides of the pneumatic tire and metal rim.

3. In a vehicle wheel, the combination of a hollow metal rim having inturned hooked edges; a pneumatic tire; a cover for the said tire having outward flanges, $e$, interlocking with the inturned hooked edges on the rim and provided with flexible edges, $e^2$, projecting between the sides of the pneumatic tire and metal rim; and a link-chain inclosed in and extending entirely around each of said outward flanges.

In testimony whereof I affix my signature in the presence of two witnesses.

WILLIAM S. CALLAGHAN.

Witnesses:
CHAS. B. MANN, Jr.,
GEO. E. TAYLOR.